(12) United States Patent
Sherman (10) Patent No.: US 6,962,274 B1
(45) Date of Patent: Nov. 8, 2005

(54) DEVICE FOR MEASURING, DISPENSING AND STORING OF GRANULAR, POWDER AND GRAIN MATERIALS

(76) Inventor: Yury Sherman, 511 Beech St., Roslindale, MA (US) 02131

( * ) Notice: Subject to any disclaimer, the term of this patent is extended or adjusted under 35 U.S.C. 154(b) by 205 days.

(21) Appl. No.: 10/663,080

(22) Filed: Sep. 16, 2003

(51) Int. Cl.$^7$ ............................................. G01F 11/10
(52) U.S. Cl. ...................... 222/361; 222/344; 222/354
(58) Field of Search ................................ 222/344, 361, 222/355, 354, 362, 197

(56) References Cited

U.S. PATENT DOCUMENTS

| | | | | |
|---|---|---|---|---|
| 2,775,270 | A | * | 12/1956 | McKillop Jr. ................ 141/373 |
| 4,531,658 | A | * | 7/1985 | Galopin .................... 222/181.2 |
| 5,421,491 | A | * | 6/1995 | Tuvim et al. ................ 222/336 |
| 5,685,461 | A | * | 11/1997 | Mitchell ..................... 222/184 |
| 6,450,371 | B1 | | 9/2002 | Sherman et al. |

\* cited by examiner

*Primary Examiner*—Michael Mar
*Assistant Examiner*—Sonia N. Khaira
(74) *Attorney, Agent, or Firm*—John Crozier (57) ABSTRACT

A hand-operated device for measuring, dispensing and storing of powder, granular and grain materials, having filling and discharging/storing positions, comprising: a container wherein the material is stored and a measuring and dispensing unit attached to the container. In the preferred embodiment the unit includes: a housing having interconnected material receiving and material discharging openings; a slide moveable back and forth inside the passageway, delivers the material from the receiving opening to the discharging opening, accommodating a predetermined volume of the material dispensed by the device in one stroke; extensions prevent bridging of the dispensed material, a spring, being extended when the slide moves inside the housing due to an outside force applied to the slide and returning the slide into its original position after the outside force is released; a retaining apparatus holding the slide inside the housing in its discharging position when the device is not in use, a stopping apparatus fixing filling position of the slide; and apparatus providing airtight closing of the measuring and dispensing unit of possible penetration of air from the container to outside atmosphere or back. In the first embodiment the device includes extensions on the slide directed towards the container to break-up clogged material within container during movement of the slide. In the second embodiment the transporting mechanism includes also a screening mechanism capable to close or open the compartment in the slide wherein the dispensed material is received.

9 Claims, 5 Drawing Sheets

DEVICE FOR MEASURING, DISPENSING AND STORING OF GRANULAR, POWDER AND GRAIN MATERIALS

BACKGROUND

1. Field of the Invention

The present invention relates to a household hand-operated device for measuring, dispensing and storing of powder, granular and grain materials such as instant and ground coffee, baby formula, dried milk, non-dairy creamer, sugar, flour, detergents, coffee beans, rice, buckwheat and the like. More particularly, it relates to a device for measuring, dispensing and storing of a predetermined volume of powder, granular and grain materials, from a special container or from a container in which the materials are sold or stored.

2. Background of the Invention

Various types of devices, combining storing and (or—only) measuring and dispensing functions for powder and granular materials have been developed in the past. Examples include U.S. Pat. No. 1,433,970 to Resek; U.S. Pat. No. 1,471,621 to McCord; U.S. Pat. No. 1,904,736 to Wooster; U.S. Pat. No. 3,072,299 to Sessions et al.; U.S. Pat. No. 3,183,190 to Crawford; U.S. Pat. No. 3,193,139 to Swindler, U.S. Pat. No. 3,421,491 to Tuvim et al.; U.S. Pat. No. 6,430,371 B1 to Sherman at al.

Most of the prior art devices for storing, measuring and dispensing powder and granular materials have some or all of the following drawbacks:

- necessity to pour powder and granular materials to be dispensed from a container in which these materials are normally sold into a special container;
- complexity of dismantling and reassembling of the device for washing and cleaning;
- inconvenience in operation, especially for elderly and handicapped people.

These drawbacks were avoided in the device described in the U.S. Pat. No. 5,421,491, however even this device, as well as all others in the prior art, does not actually provide airtight conditions for storing the materials. As a result, humidity inside the container is uncontrollable, sometimes during several weeks or even more of storage. If the humidity is high, hygroscopic materials such as instant coffee, flour, sugar, salt, etc. stored in the container, become caked and quickly deteriorate. In the case of a coffee dispenser, coffee freshness steadily declines during its storage and dispensing because of losing aroma, even at low air humidity. This drawback is especially serious for areas of high humidity climate where the prior art devices are completely impractical.

Another drawback of the device described in the U.S. Pat. No. 5,421,491, as well as other earlier developed structures based on hand-operated plunger-type dispensers, is that placing a container with attached dispensing device requires additional space on a shelf or a kitchen table. This drawback is caused by a slide extended from the device's contour. The extended slide also undesirably affects the esthetic characteristics of the device.

A further step in the improvement of dispensing devices was made in the U.S. Pat. No. 6,450,371 B1. The described dispenser provides airtight conditions for stored materials while providing for measured dispensing of the materials; the device is compact, has monolith-like shape during storage of the material, and it is esthetically better than the dispensers of the prior art design.

However, even this device can be further improved. In the case of dispensing of materials, including sticky particles, consistency of the material measured flowing out of the dispenser is not provided by the prior art device. This happens because the sticky particles form a dome-shaped bridge above an input opening in the dispenser's slide that leads to unstable filling of the opening. As a result, the amount of the dispensed material can be quite different from that desired. This limits the field of application of the device to materials consisting of non-sticky particles or requires shaking the device before each working stroke and that is inconvenient.

Another drawback of the device, is usage of a compression spring as a mechanism for motion of the device's slide from its discharging position to filling position. Providing lateral stability of the compression spring determines the minimal diameter of the spring, and thus the minimal height of the slide. In many cases it increases the height of the device. Position of the spring between the slide and the housing also increases the size of the device.

Still another drawback of the device is its inability to measure and dispense grain materials, such as coffee beans, rice, buckwheat, etc. When the slide filled with the material is moved toward discharging opening, one or several grains can take a position partially outside the slide's counter that block movement of the slide toward its discharging position. This significantly narrows the field of application of the devices designed according to U.S. Pat. No. 6,450,371 B1.

The main objects of the present invention are to overcome the above drawbacks of the prior art devices, i.e.:

- To prevent formation of bridge formed by sticky particles of the dispensed materials above an input opening in a slide of the dispenser.
- To use for backward motion of a slide of the device the means that does not lose lateral stability under the applied loads.
- To develop a device that can be used for dispensing not only powder and granular materials, but grain materials also.

Other objects of the invention, as well as particular features, elements and advantages thereof, will be elucidated in, or be apparent from, the following description and the accompanying drawing figures.

SUMMARY OF THE INVENTION

The present invention achieves the above objects, among others, by providing a hand-operated device for measuring, dispensing and storing of powder, granular and grain materials, including sticky materials, comprising in a preferred embodiment: a container wherein the material is stored and a measuring and dispensing unit attached to the container. In a preferred embodiment the unit includes: a housing having interconnected material receiving and material discharging openings and a transporting mechanism having a slide moveable back and forth inside said passageway, delivers the material from the receiving opening to the discharging opening, accommodating a predetermined volume of the material dispensed by the device in one stroke; having an extension spring being extended when the slide is moved inside the housing during its working stroke, the spring returns the slide in its original position after being released; having a retaining means holding said slide inside the housing in its discharging position when the device is not in use, a stopping means fixing filling position of the slide, and having a sealing means providing airtight closing of the ways of possible penetration of air from the container to outside atmosphere or back. The slide also includes extensions movable together with the slide, intersecting the counter of a bridge formed by sticky particles and thus destroying it, providing consistency in measuring of the dispensed material.

In the first version of the preferred embodiment, the slide and the housing include also blades with sharp edges directed toward each other forming a shears capable to cut out the dispensed grains when the slide is pushed inside the housing. The device provides measuring and dispensing of powder, granular and not-solid-grain materials.

In the second version of the preferred embodiment, the dispensing unit, in addition to the transporting mechanism, includes also a screening mechanism having closed and opened positions. The mechanism closes the discharging opening when the slide is in its filling position or moves to its opening position, and opens the discharging opening when the slide is in its discharging position. The device provides measuring and dispensing of solid-grain materials.

BRIEF DESCRIPTION OF THE DRAWINGS

Understanding of the present invention and the various aspects thereof will be facilitated by reference to the accompanying drawing figures, provided for purpose of illustration only and not intended to define the scope of the invention, on which.

DETAILED DESCRIPTION OF THE PREFERRED EMBODIMENT

Reference should now be made to the drawing figures on which similar or identical elements are given consistent identifying numerals throughout the various figures, and on which parenthetical references to figure numbers direct the reader to the view(s) on which the element(s) being described is (are) best seen, although the element(s) may be seen on other figures also.

Referring to the drawings in detail, in FIGS. 1–4 a device for storing, measuring and dispensing of powder and granular materials consisting of sticky or not-sticky particles is shown in preferred embodiments.

The device consists of two main parts (FIG. 1): a container 1 wherein the material is stored, and at least one measuring and dispensing unit 2 attached to the container. Coupling of container 1 and unit(s) 2 is known from the prior art.

A device including one dispensing unit is described below.

Figure 1:
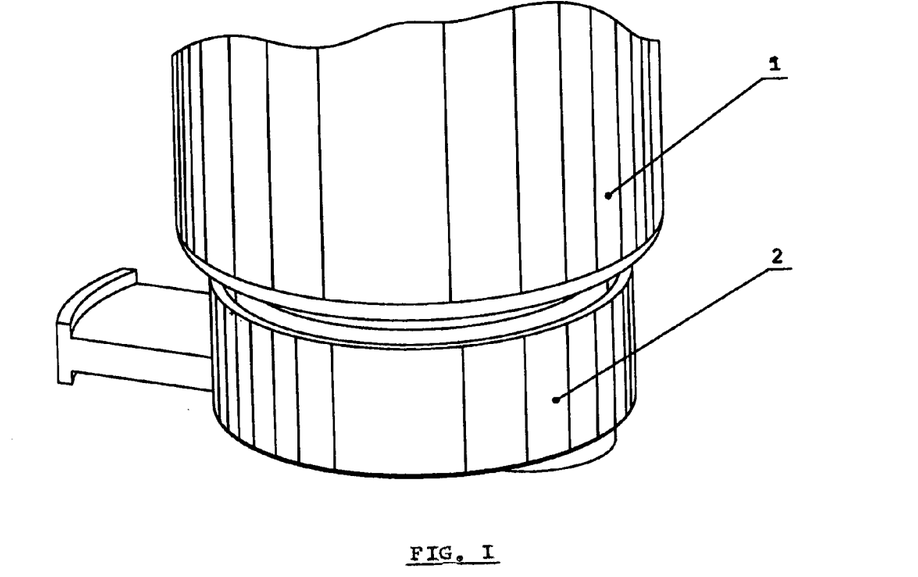
FIG. 1 is a fragmentary, side elevation view of a dispenser of the present invention.
Figure 2:
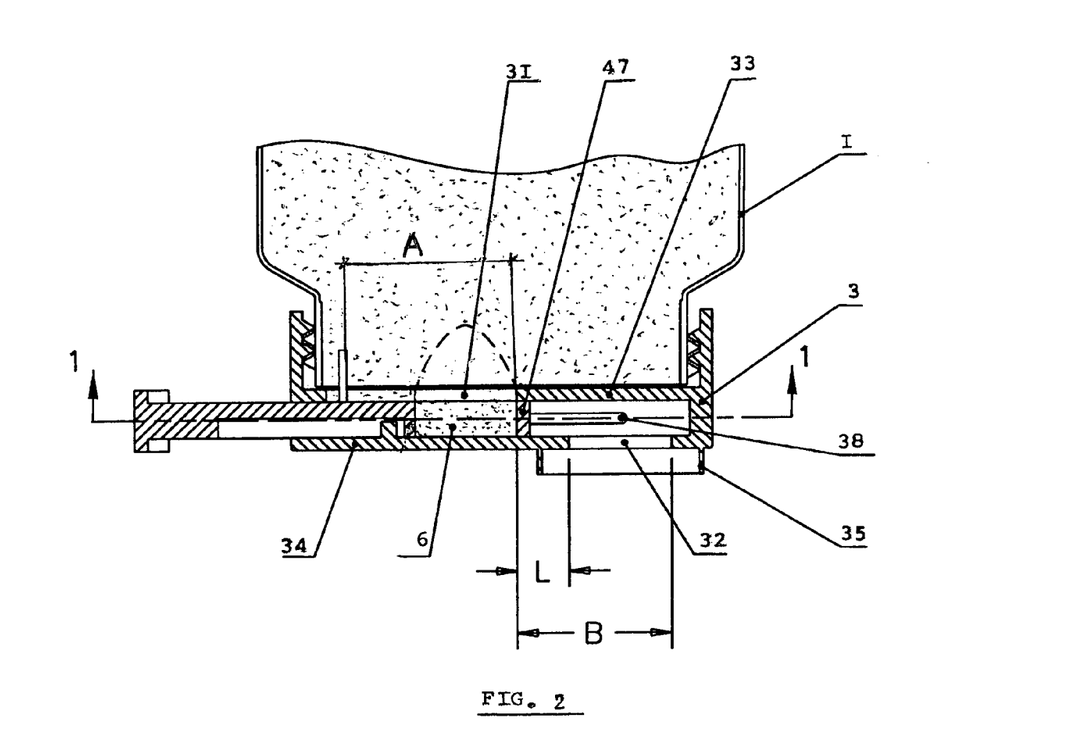
FIG. 2 is a fragmentary, cross sectional view of the device in its filling position.
Figure 3:
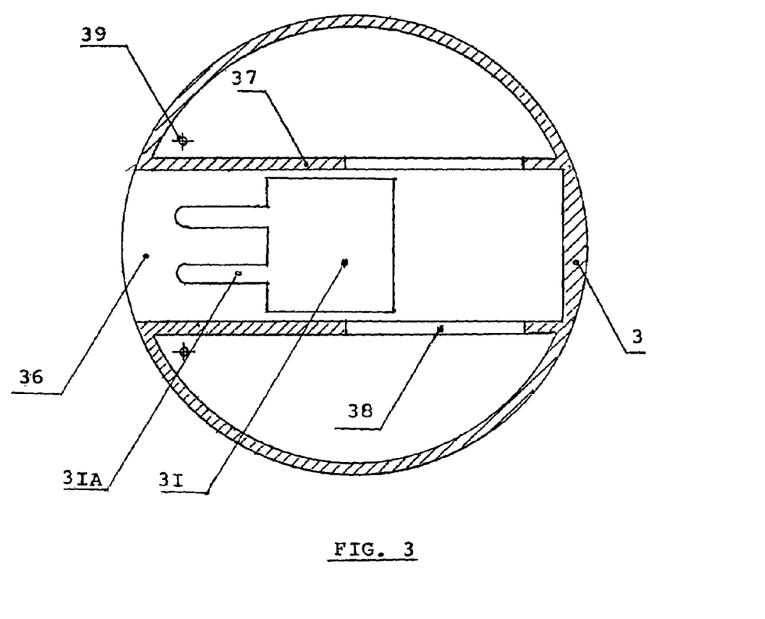
FIG. 3 is a cross sectional view of a housing along line "1—1" of FIG. 2 (slide is not shown).
Figure 4A:
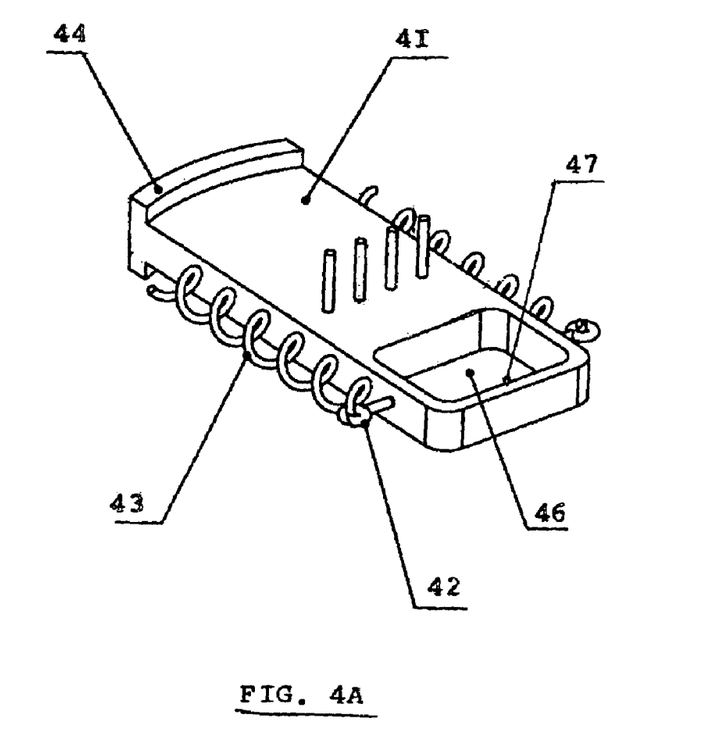
FIG. 4A is an isometric view of the slide of the device.
Figure 4B:
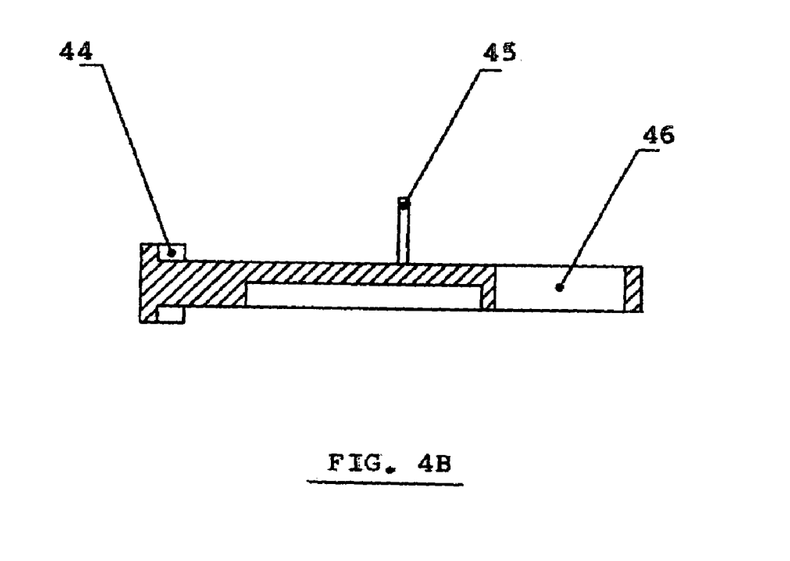
FIG. 4B is a cross sectional view of the slide of the device.

In FIGS. 2–4 a housing and a transporting mechanism included in the unit 2 are shown.

Housing 3 includes material receiving opening 31 and material discharging opening 32. Opening 31 is located in inner wall 33 of the housing facing toward container 1. Opening 32 is located in wall 34 of the housing facing outside (FIG. 2). A lateral passageway 36 having two walls 37 interconnects openings 31 and 32. Passageway 36 is capable to accommodate a slide of the transporting mechanism. Walls 37 have slots 38 for hooks extended from the slide through the walls. Dimensions of the slots provide free movement of the hooks inside the slot when the slide is moved from its filling to discharging position. The housing includes also extensions 39 outside passageway 36, close to walls 37 for supporting springs of the transporting mechanism (FIG. 3). Opening 32 has an extended nozzle 35 through which the material is dispensed.

The transporting mechanism of the device is shown in FIGS. 4A and 4B. The mechanism's main function is delivery of the material from material receiving opening 31 to material discharging opening 32. The mechanism consists of slide 41 and extension springs 43.

The slide is inserted into passageway 36 of the housing and is moveable back and forth along passageway 36. Slide 41 includes an opening 46, which, in combination with walls 33 and 34 of the housing, defines a moveable compartment capable to receive a predetermined volume of the material delivered by the dispenser in one stroke. Cross sectional sizes and shape of the opening 46 are substantially the same as of openings 31 and 32. Opening 46 is located along the slide such that it can be registered with openings 31 and 32 in the housing when the slide is moved along passageway 36. In registered position with opening 31 (FIG. 2), opening 46 is filled with the material. In registered position with opening 32, the material is poured out from opening 46. Handle 44 stops the slide when it is pushed inside the housing and keeps the slide in discharging position when the handle is rests against housing 3. To provide dispensing of accurate measures of the material, it is necessary to prevent direct pouring of the material from storage container 1 to opening 32 via opening 31. Distance "L" (FIG. 2) between openings 31 and 32 should be determined based on this condition.

Slide 41 has hooks 42 extended from side surfaces of the slide. The hooks together with extensions 39 of housing 3 support springs 43. A distance between 39 and 42, and length of the springs provides tension of the spring when the slide in its filling position. As the slide is being moved inside the housing, the reaction force of opposite direction steadily increases. This force returns the slide into its filling position after the material is dispensed and the slide is released.

The peculiarity of sticky particles of the dispensed materials is the formation of a dome-shaped bridge above the receiving opening (shown in FIG. 2 by dotted line). The bridge causes inconsistency in filling the opening and thus, irregularities in dosing of the materials that are unacceptable. For resolution of the problem, slide 41 includes extended pins 45 directed toward container 1. Distance A between the pins and wall 47 of opening 46 must be slightly longer then distance B between wall 47 and discharging opening 32, as is shown in FIG. 2. As a result, the pins will not interfere with movement of the slide to the end of its discharging position. The pins, moving together with the slide, intersect the bridge formed by particles of the dispensed material two times during one working stroke of the device: when the slide is moved from its filling position to discharging position and back. Opening 31 of wall 33 of the housing includes slots 31A (FIG. 3) providing free movement of pins 45 along passageway 36.

To prevent full withdrawal of slide 41 from passageway 36 at its backward movement after the material is dispensed, and to fix registered interposition of openings 31 and 46 when opening 46 is being filled with the material, unit 2 includes a stopping means that are known from the prior art (U.S. Pat. No. 6,430,371 B1. See also FIG. 2).

The device includes a retaining means holding the transporting mechanism in its discharging position when the device is not in use. The retaining means are known from the prior art (U.S. Pat. No. 6,430,371 B1, not shown in the drawings).

The device includes a sealing means providing airtight closing of slide 41 in the housing 3. The sealing means are known from the prior art (U.S. Pat. No. 6,450,371 B1, not shown in the drawings).

Operation of the device is the same as described in the U.S. Pat. No. 6,450,371 B1.

As is clear, unit 2 can include more than one transporting mechanism of different measures placed parallel to each other.

Figure 5:
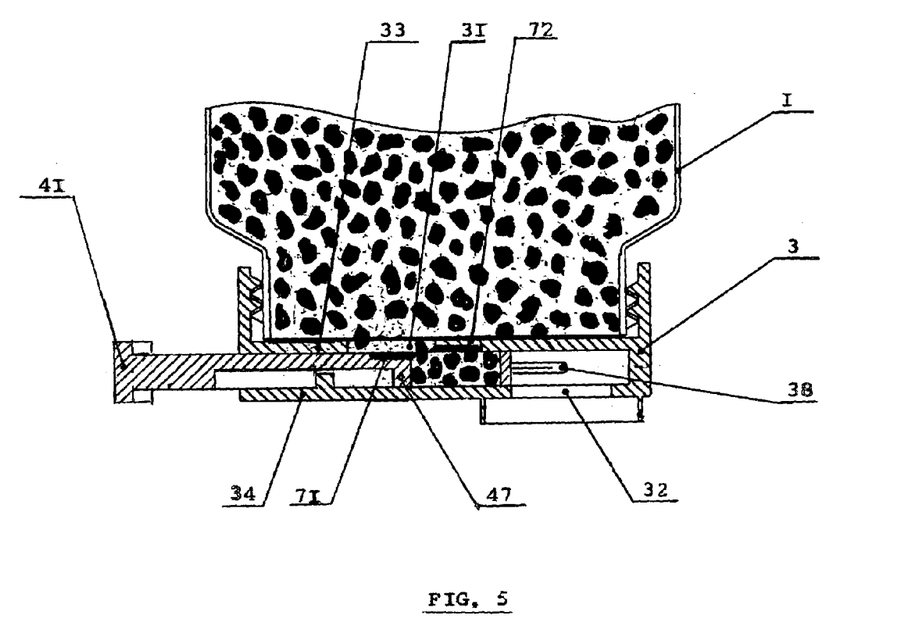
FIG. 5 is a fragmentary, cross sectional view of the device for not-solid-grain materials, wherein a grain blocks slide's movement to the end of its discharging position.
Figure 6:
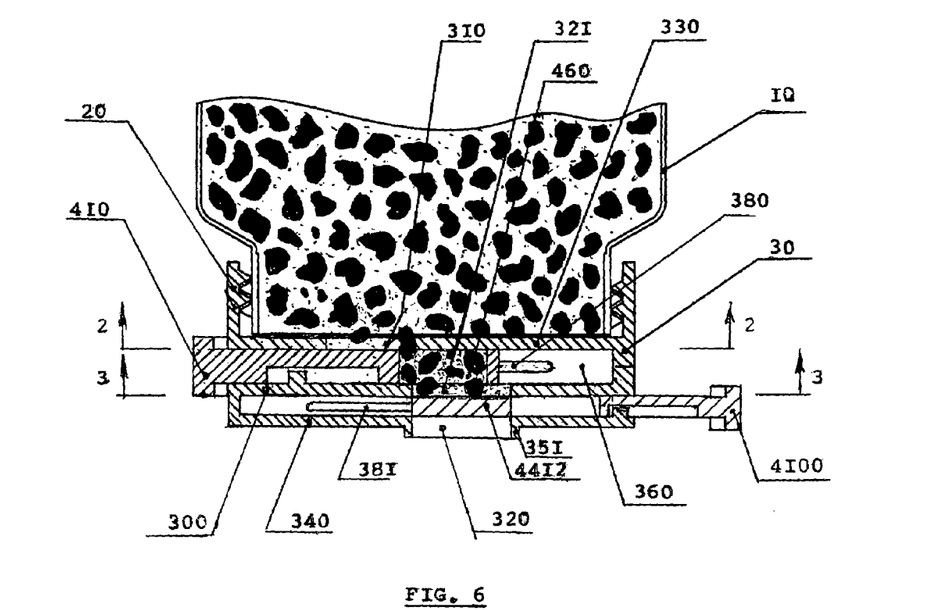
FIG. 6 is a fragmentary, cross sectional view of the device for solid-grain materials, wherein a grain blocks slide's movement to the end of its discharging position.

The described device provides measuring, dispensing and storing of powder and granular materials, but usually cannot dispense properly a wide range of grain materials, such as rice, buckwheat, pearl, coffee beans, seeds, etc. The problem is: when the slide filled with the material is moved toward discharging opening, one or several grains can take a position partially outside the slide's counter that block movement of the slide toward its discharging position as is shown in FIGS. 5 and 6. Depending on solidity of the grains to be dispensed two versions of the device are provided.

The first version that can be applied for dispensing of not-solid-grain materials is shown in FIG. 5. Wall 47 of side 41 and wall 33 of housing 3 include blades 71 and 72 which blades are directed toward each other and form a shears. The grains that interfere movement of the slide toward opening 32 get a position between blades 71 and 72 (See FIG. 5) that are moved toward each other. Under the shear forces generated by blades 71 and 72, the grains usually pop upward, inside container 1, or downward, inside opening 46. Otherwise the grains are cut out by the blades. Inclusion of blades 71 and 72 forming shears capable to cut out non-solid grains is the only difference between the devices according to this version and that described above.

A device for dispensing solid-grain materials is shown in FIGS. 6–9. "Solid" means the grains that cannot be easily cut out by the above-described blades 71 and 72. In this version the device consists of two main parts: container 10 wherein the material is stored, and dispensing unit 20 attached to the container. Coupling of container 10 and unit 20 is known from the prior art.

Unit 20 comprises: a housing, a transporting mechanism, a screening mechanism having closed and opened positions, a retaining means and a sealing means (the two last elements are known from the prior art, U.S. Pat. No. 6,450,371 B1, and are not shown).

Figure 7:
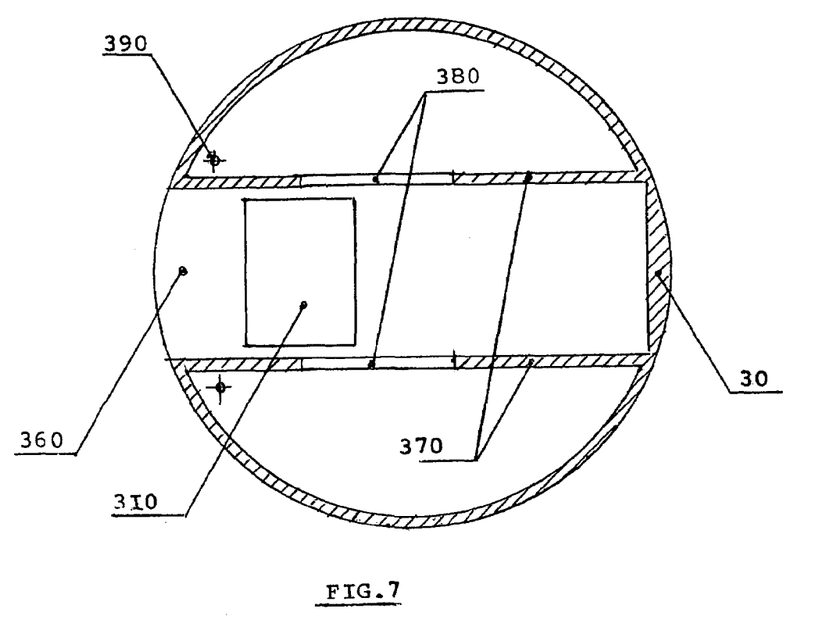
FIG. 7 is a cross sectional view of the housing along line "2—2" of FIG. 6 (slide is not shown).

Housing 30 includes material receiving opening 310 and two material discharging openings 320 and 321 (FIG. 6). Opening 310 is located in inner wall 330 of the housing facing toward container 10. Opening 320 is located in outer wall 340 of the housing facing outside. Opening 321 is located in intermediate wall 300 of the housing placed between walls 330 and 340 (FIG. 6). Openings 310 and 321 are interconnected by a lateral passageway 360 having walls 370, capable to accommodate slide 410 of the transporting mechanism. The housing includes also extensions 390 outside passageways 360, close to walls 370, as is shown in FIG. 7. Opening 320 has an extended nozzle 351 through which the material is dispensed.

Structure of the transporting mechanism and principles of its work are similar to described above and shown in FIGS. 2, 3, 4A and 4B. The mechanism's main function is delivery of the material from material receiving opening 310 to material discharging opening 321. The only difference compared with the transporting mechanism of the previous version is that the distance "L" (see FIG. 2 in the preferred embodiment) in this version of the device is zeroed.

Slide 410 of the transporting mechanism (FIG. 6) takes its filling position when opening 310 in the housing is registered with opening 460 in the slide and its discharging position when opening 321 in the housing is registered with opening 460 in the slide. Walls 370 include slots 380 (FIGS. 6,7) the dimensions of which provide free movement of hooks extended from the slide inside the slot (FIGS. 4A and 4B) when slide 410 is moved from its filling to discharging position and back.

Figure 8:
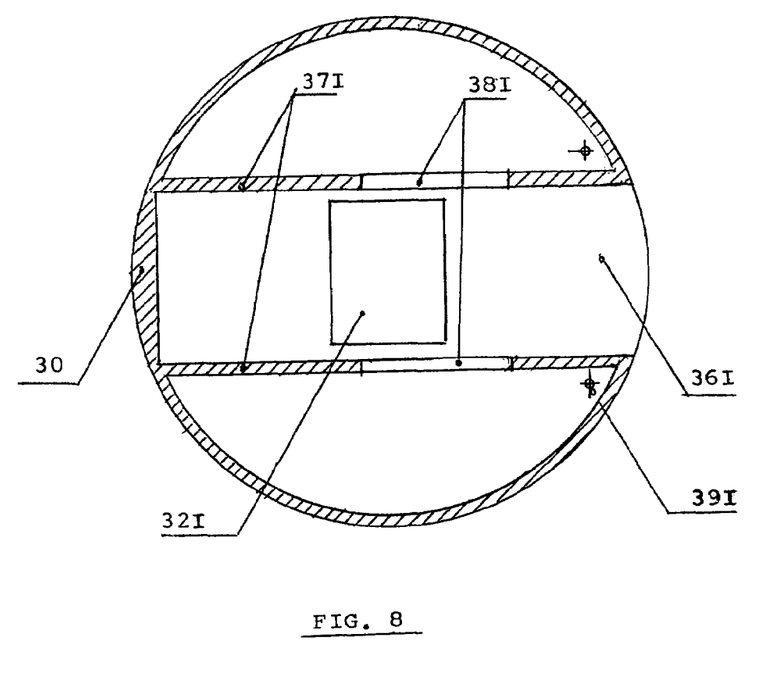
FIG. 8 is a cross sectional view of the housing along line "3—3" of FIG. 6 (screener is not shown).
Figure 9:
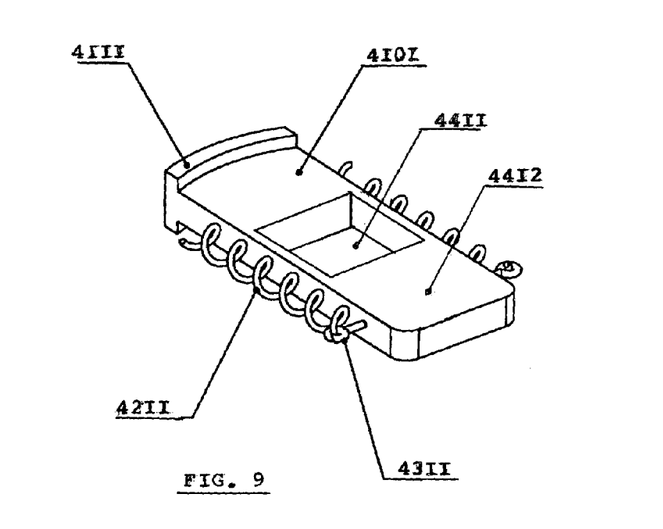
FIG. 9 is an isometric view of the screener of the device.

The main function of screening mechanism 4100 (FIG. 6) is closing and opening of discharging opening 321 (FIG. 6). The mechanism consists of screener 4101 having opening 4411 and springs 4211 (FIG. 9). Structurally the screener is similar to the described slide 410. It is accommodated by passageway 361 having walls 371 (FIGS. 6,8,9). Walls 371 include slots 381 the dimensions of which provide free movement of the hooks extended from the screener inside the slot when screener 4101 is moved from its closed to opened position and back. Sizes of the opening 4411 are substantially the same as of openings 321. Opening 4411 is located along the screener such that its front blind portion 4412 (FIGS. 6 and 9) can separate or interconnect openings 321 and 320 in the housing when the screener is moved along passageway 361. When openings 321 and 320 are interconnected, the screening mechanism is in opened position. When the openings are separated, the screening mechanism is in closed position. The screener has extended hooks 4311. Each hook supports one end of each spring 4211. Another end of the spring is supported by extension 391 of the housing. (FIG. 8). A distance between 39 and 4311, and length of the springs provides generation of pull out force applied to the screener in its closed position. As the screener is being moved inside the housing, the reaction force pulling the screener outside steadily increases. This force returns the screener into its closed position after the material is dispensed.

To prevent full withdrawal of slide 410 and screener 4101 from housing 30 during their movement along passageways 360 and 361, as well as to fix filling and discharging positions of the slide and closed and opened position of the screener, the device includes two stopping means, one for the slide and one for the screener, that are known from the prior art (U.S. Pat. No. 6,450,371 B1, shown in FIG. 6).

The device includes a retaining means holding slide 410 in its discharging position and screener 4101 in its opened position when the device is not in use. As the retaining means it is used a removable cap providing airtight closing of the nozzle 351. The cap includes an extension capable to be inserted in openings 310, 321 and 320 when the openings are in registered position. The described retaining means (not shown in the drawings) are generally the same as is disclosed in the U.S. Pat. No. 6,430,371 B1.

The device can include a sealing means providing airtight closing of slide 410 and screener 4101 in the housing of the device. The sealing means are known from the prior art (U.S. Pat. No. 6,450,371 B1, not shown in the drawings).

In order to operate the device starting from its storing position, the retaining means is removed. The slide and the screener become released and under the spring forces pop out. Then container 10 is turned over. In this position grains of the material to be dispensed pour into opening 460 of the slide and fill the compartment formed by walls of the housing and opening 460. At this moment screener 4101 closes opening 321. The user pushes slide 410 inside housing 30 to transfer the material contained in said compartment against discharging opening 321. As a result of the pushing, opening 460 in the slide can either register with opening 321 or be stuck in intermediate position because one or several grains of the material takes positions partially outside the slide counter and thus block movement of the slide, as is shown in FIG. 6. After that, in both cases, the user, continuing to push slide 410 inside the housing, pushes screener 4101 in its opened position, i.e. inside the housing, providing complete or almost complete registration of openings 321 and 320 with opening 460 in the slide. The released material falls down through openings 321 and 320. As is clear from FIG. 6, in case the grains block out movement of the slide a slot connecting container 10 with opening 460 in the slide cannot exceed maximum size of the dispensed grains. Accordingly, some grains of the dispensed material, smaller then blocking one, can go directly from jar/container 10 to the material receiving receptacle. It will increase the delivered dose of the material compare with the projected one. However width of the slot is rather small, so only random grains will be able to go through the slot during about a second required for complete discharging the material and return of the slide to its filling position. Inaccuracy of the dispensed doses would be minor, usually acceptable for practical needs. When the dispensing procedure is over, the user pushes the slide and the screener into the discharging position where openings 321 and 320 and opening 460 in the slide are registered and inserts into the nozzle 351 of the device the retaining means.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown in the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A hand-operated device for measuring, dispensing and storing of powder, granular and grain materials, comprising:
   (a) a container wherein the material is stored;
   (b) at least one measuring and dispensing unit attached to said container;
   (c) said unit including a housing and at least one transporting mechanism;
   (d) said housing having two substantially parallel walls: one directed to said container, including at least one material receiving opening, and the other directed outside, including at least one material discharging opening, said openings being interconnected by at least one lateral passageway accommodating said transporting mechanism;
   (e) said transporting mechanism including a slide moveable back and forth inside said passageway and at least one spring;
   (f) said slide having filling and discharging positions, including an opening capable to accommodate a predetermined volume of the material dispensed by said device in one stroke, delivering the material from said receiving opening to said discharging opening, including means preventing creation of a bridge formed by sticky particles of the dispensed material above the material receiving opening;
   (g) said means preventing creation of said bridge, being extensions from said slide directed toward said container, moveable together with said slide along said passageway, crossing a potential counter of said bridge during said motions of said slide along said passageway; and
   (h) said at least one spring being attached to said slide, and being extended when the slide moves inside said housing due to outside force applied to said slide and returning said slide into its original position after said outside force is released.

2. A device according to claim 1, including means preventing full withdrawal of said slide from said passageway when said slide is moved from its discharging position to its filling position, fixing registered interposition of said receiving opening in the housing and said opening(s) in said slide.

3. A device according to claim 1, including retaining means holding said transporting mechanism in its discharging position when said unit is not in use, capable to provide airtight closing of said discharging opening.

4. A device according to claim 1, including sealing means capable to provide airtight contact between said slide and said housing.

5. A device according to claim 1, wherein said side and said one of said two substantially parallel walls directed to said container include sharp edged surfaces directed toward each other, forming a shears capable to cut out grains of said grain materials when said slide is moved from its filling position to discharging position.

6. A device according to claim 1, including more than one measuring and dispensing unit attached to the container.

7. A device according to claim 1, wherein said measuring and dispensing unit includes more than one slide.

8. A hand-operated device for measuring, dispensing and storing of grain materials, comprising:
   (i) a container wherein the material is stored;
   (j) at least one measuring and dispensing unit attached to said container;
   (k) said unit including a housing, a transporting mechanism and a screening mechanism;
   (l) said housing having three substantially parallel walls: the first directed to said container, including a material receiving opening, the second directed outside, including a material discharging opening, and the third placed between said first and said second walls, including a material discharging opening, said openings in said first and said third walls being interconnected by lateral passageway accommodating a slide of said transporting mechanism, said openings in said second and said third walls being registered, including walls between said second and said third walls, forming a passageway capable to accommodate a screener of said screening mechanism;
   (m) said slide of said transporting mechanism moveable back and forth inside said passageway between said first and third walls and at least one spring;

(n) said slide of said transporting mechanism, having filling and discharging positions, including an opening capable to accommodate a predetermined volume of the material dispensed by the device in one stroke, delivering the material from said receiving opening to said discharging opening;

(O) said at least one spring of said transporting mechanism, attached to said slide and said housing of said device, being extended when said slide moves inside said housing due to outside force applied to said slide, returning said slide into its original position after said outside force is released;

(p) said screening mechanism including a screener moveable back and forth inside said passageway between said second and said third walls and said at least one spring;

(q) said screener of said screening mechanism, having closed and opened positions, including an opening capable to interconnect said openings in said second and third walls when said screener is moved along said passageway accommodating said screener; and (r) said at least one spring of said screening mechanism being extended when said screener moves from its closed to its open position due to said outside force applied to said screener and returning said screener into its original position after said load is released.

9. A device according to claim 8, including more than one measuring and dispensing unit attached to the container.

* * * * *